United States Patent [19]

Berglund et al.

[11] Patent Number: 5,827,550
[45] Date of Patent: Oct. 27, 1998

[54] FERMENTED MEAT TRIM AND ITS INCORPORATION IN MEAT

[75] Inventors: Maria Berglund, Kagerod; Lars Göran Bodenas, Munka Ljungby; Jonas Peter Halden, Vallahra, all of Sweden

[73] Assignee: Nestec S.A., Vevey, Sweden

[21] Appl. No.: 735,536

[22] Filed: Oct. 23, 1996

[30] Foreign Application Priority Data

Oct. 24, 1995 [EP] European Pat. Off. ............. 95202882

[51] Int. Cl.$^6$ ............................ A23L 1/317; A23L 1/318
[52] U.S. Cl. ............................ 426/59; 426/55; 426/56; 426/641; 426/646
[58] Field of Search ................. 426/55, 56, 59, 426/641, 645, 646, 524

[56] References Cited

U.S. PATENT DOCUMENTS

| | | |
|---|---|---|
| 1,129,868 | 3/1915 | Hoy . |
| 2,907,661 | 10/1959 | Niven ........................................ 426/59 |
| 3,821,445 | 6/1974 | Okamura ................................. 426/651 |
| 4,229,458 | 10/1980 | Dreano et al. . |
| 4,254,151 | 3/1981 | Townsend . |
| 4,304,868 | 12/1981 | Gryczka ................................... 426/56 |
| 4,362,750 | 12/1982 | Swartz . |
| 4,402,987 | 9/1983 | von Lersner et al. . |
| 4,539,210 | 9/1985 | O'connell ................................ 426/56 |
| 4,579,740 | 4/1986 | Matrozza ................................. 426/56 |
| 4,728,518 | 3/1988 | Gonzalez ................................. 426/56 |
| 4,847,097 | 7/1989 | Boudreaux .............................. 426/56 |
| 4,886,673 | 12/1989 | Hammes .................................. 426/59 |
| 4,960,599 | 10/1990 | Cozzini et al. . |
| 5,015,487 | 5/1991 | Collison ................................... 426/59 |
| 5,374,433 | 12/1994 | Bowling ................................... 426/55 |
| 5,576,035 | 11/1996 | Bowling ................................... 426/55 |

FOREIGN PATENT DOCUMENTS

| | | |
|---|---|---|
| 804296 | 11/1958 | United Kingdom . |
| 1530476 | 11/1978 | United Kingdom . |
| WO8400283 | 2/1984 | WIPO . |

OTHER PUBLICATIONS

Komareck 1974 Food Products Formulary vol. / AVI Publishing Company, Inc Westport CT pp. 26–33 38–55.

Gerrard 1969 Sausage and Small Goods Production Leonard Hill Books London pp. 94–96, 98–101.

Romans 1977 The Meat We Eat The Interstate Printers & Publishers Inc Illinois pp. 564–566.

Banwart 1981 Basic Food Microbiology AVI Publishing Co., Inc Westport CT pp. 285, 286, 287, 293, 294 Carolyn Paden Sep. 9, 1997.

Derwent Abstract, Accession No. C86–082011, WPI Database Accession No. 86—190396/30, abstract of Muller, German Patent application No. DE 3500 914 A (1986).

*Primary Examiner*—Carolyn Paden
*Attorney, Agent, or Firm*—Vogt & O'Donnell, LLP

[57] ABSTRACT

Prior to incorporating meat trimmings into a meat piece, the trimmings are inoculated with starter culture and fermented with the bacteria from the culture to obtain fermented meat trim particles and then frozen for incorporation into a meat piece.

20 Claims, No Drawings

FERMENTED MEAT TRIM AND ITS INCORPORATION IN MEAT

BACKGROUND OF THE INVENTION

The present invention relates to incorporation of meat trimmings into meat.

Meat trimmings are obtained from meat during the standard preparation of whole cuts of meat in the meat industry. The trimmings are usually, but not always, of low quality and usually contain some fat and some muscle tissue. It is possible, by using technology introduced onto the market in recent years, to incorporate suspensions made of meat trimmings into whole cuts of like meat to increase the weight using a multi-needle injector. By controlling parameters such as the amount of trimmings injected, the meat/fat ratio and the quality of the meat, this technology enables the production of cooked ham or other marinated meat products without affecting the standard quality with regard to flavour, shelf-life and lack of visibility of the suspension, and in some cases improving it, for instance, with regard to binding and yield. Such a process is described in U.S. Pat. No. 4,960,599. The cost saving of injecting trimmings is considerable when the trimmings are of low value compared to whole cuts of meat.

In order to impart a specificity to the flavour and to improve microbiological stability, it has been proposed to ferment raw marinated meat by using a starter culture in a brine or marinade prior to cooking to produce bacteriocins. However, since the raw marinated meat can under no circumstances be allowed to ferment at a temperature higher than about +8° C., the biggest problem is to find a starter culture that can produce bacteriocins and a specific flavour at low temperature. We have tested some commercially available cultures, but the effect on the final quality of the product regarding flavour and microbiological stability is minimal. In addition, the production time before the cooking step must be prolonged considerably.

SUMMARY OF THE INVENTION

We have found, surprisingly, that by fermenting meat trimmings with a bacteria prior to incorporation into meat, it is possible to adapt fermentation parameters such as temperature, time, humidity and ingredients, etc. to their optimal values.

Accordingly, the present invention provides a process for preparing meat containing meat trimmings therein which comprises incorporating into a meat piece a suspension of meat trimmings in a brine, marinade, or pickle having a temperature which does not exceed 1° C. and characterised in that before freezing, the meat trimmings are fermented with a bacteria.

The present invention also includes the product of the process which is, thereby, a meat piece having incorporated therein bacterially-fermented meat trimmings.

DETAILED DESCRIPTION OF THE INVENTION

In carrying out the process of the present invention, the meat used may be obtained from all types of meat such as pork, beef, lamb, poultry and fish. Raw whole cuts of meat may be chilled, e.g. to a temperature from −2° to 12° C., preferably from 2° to 10° C. and especially from 3° to 8° C., and deboned, and the trimmings may be removed in the usual manner. The meat trimmings used preferably are those removed from the actual piece of meat to be treated, but it is also possible to use trimmings from the same type of meat as the meat to be treated. It is also possible to use trimmings from a type of meat other than the meat to be treated, although this is generally less preferred.

The trimmings may be incorporated into trimmed whole meat cut pieces as such or into smaller portions of meat formed by dividing the whole meat cut pieces into smaller portion pieces having an average diameter of from 0.5 to 10 cm, more conveniently from 1 to 5 cm.

When the fermented meat trimmings are incorporated into whole cuts of meat, this may be carried out conventionally by injection, using, for instance, a multi-needle injector. When the meat trimmings are incorporated into smaller portions of meat, this may be carried out by mixing the meat trimmings with the smaller portions of meat, e.g. with agitation such as stirring or tumbling. For example, a suspension of the meat trimmings may be added directly to the meat pieces in a tumbler.

Before fermentation, the meat trimmings are conveniently ground until the majority of the particles have a size of less than 30 mm diameter and have an average particle size of from 1 mm to 5 mm, preferably from 2 mm to 4 mm diameter.

Before, during or after the addition of a bacteria starter culture, the ground meat trimmings may be mixed with a brine, pickle, or marinate. As is well known, a pickle is used for preserving meat and may contain brine, or other salt, or vinegar or acid liquor, while a marinade is used for flavouring meat and may contain brine, vinegar or wine, oil, spices and herbs, etc. For instance, the ground meat trimmings may be mixed with sugar and a nitrite salt such as sodium nitrite. The pH of the mixture is usually in the range of from about 5.2 to 6.3, preferably from 5.5 to 6.0.

Suitable bacteria providing starter cultures are species Lactobacillus, Streptococcus and Pediococcus and preferable strains are *Lactobacillus sake* and *Pediococcus acidilacti* and *salami*. Starter culture prepared with the bacteria may be mixed in water, as is conventional, before being added to the meat trimmings. The amount of starter culture used may be from 0.1 to 10 ml, preferably from 0.5 to 5 ml and especially from 0.75 to 2.5 ml per kg of ground meat trimmings. The mixture of ground meat trimmings and the starter culture in the brine, pickle, or marinade is advantageously packed in a vessel or bin suitable for fermentation, such as a plastic bag or pouch, within which fermentation is allowed to proceed. The fermentation may take place at a temperature from 0° to 55° C., preferably from 8° to 45° C. and more preferably from 15° to 40° C. over a period of from about 12 hours to about 7 days, preferably from 18 hours to 5 days. During the early stages of the fermentation, e.g. after a period of from about 6 to 30 hours and more usually after a period of from 12 to 24 hours, the pH falls, for instance to a pH of from 5.2 to 5.3 or below.

After the fermentation, the fermented ground meat trimmings are frozen, e.g. to a temperature from −5° to −30° C., preferably from −15° to −25° C. After freezing, the fermented ground meat trimmings are advantageously flaked, e.g. to particles having a maximum volume of about 2 cc, preferably a maximum volume of 1 cc.

After freezing, a frozen brine, pickle, or marinade may be mixed with the fermented meat trimmings to form a suspension. The mixing may be performed by emulsifying one or more times, e.g. up to four times. The frozen brine may be at a temperature of from 0° to −30° C. and preferably from −5° to −12° C. The ratio of brine, pickle, or marinade to the fermented meat trimmings may be from 1:1 to 20:1, preferably from 1.5:1 to 15:1 and more preferably from 2:1 to 9:1. For example, a brine may consist of a mixture of nitrite salt, sugar, ascorbate and water. The nitrite and ascorbate salts are conveniently the sodium salts.

The suspension of meat trimmings in a brine, marinade, or pickle is then warmed to a temperature of not greater than +1° C., for instance from about −2° to −10° C., preferably from −40° to −8° C., and incorporated into the chilled meat. The temperature of the suspension should not exceed +1° C. since, otherwise, proteins would be extracted which would cause the suspension to thicken rapidly, and this may cause subsequent clogging of the needles when the meat trimmings are injected into the meat with needles.

The amount of meat trimmings incorporated into the meat may be up to 15% by weight based upon the weight of the meat and may vary, e.g., conveniently from 1 to 10% and preferably from 2 to 6% by weight. During the incorporation of the suspension of the meat trimmings into the meat, especially by injection, a portion of the suspension of the meat trimmings is squeezed out of the meat and may be returned to the batch containing the mixture of trimmings with brine where it is chilled down again. Any portion of the suspension returned is preferably emulsified at least one, more preferably at least two or three times, with the next batch because it may contain small meat particles which are disrupted from the muscles during injection and which could cause clogging of the needles. When the meat trimmings are incorporated by injection, a part of the suspension of the meat trimmings preferably is added separately so that some may be absorbed during tumbling, since it is not usually possible to incorporate the exact desired percentage of suspension by injection.

After the injection, the meat may be processed conventionally.

The meat product may be a chilled product which is either non-cooked or cooked, or it may be frozen, preferably marinated, or dried. Examples of non-cooked chilled meat products are LARDON product, bacon, cold smoked ham, etc. An example of a cooked and chilled meat product is cooked ham. For a cooked, chilled product such as cooked ham, the meat may undergo tenderisation, tumbling, moulding, cooking, chilling, storage, slicing and packaging by conventional methods such as are well known in the art. The process of the present invention may provide protection against undesirable bacteria such as Listeria in chilled products and provide improved flavour in frozen and dried products.

EXAMPLES

The following Examples further illustrate the present invention. Parts and percentages are by weight.

Example 1

A whole ham was chilled to 5° C. and trimmed by removing fat, sinews, etc., before being separated into different whole meat cuts. The trimmings removed from the whole ham, i.e., the fat, sinews, etc., were ground in a Kilia grinder to an average particle size of 3 mm, mixed in a Hobart mixer with, per gram of trimmings, 2% dextrose, a mixture of 0.5% sodium nitrite and 0.5% sodium chloride, 1% sodium chloride, and 1.0% of a starter culture of *L. sake* containing $10^6$–$10^7$ bacteria. The mixture was packed into plastic pouches and fermented at 25° C. for 36 hours. The pH fell rapidly during the first day from an initial value of pH 6 to pH 5.

After fermentation, the fermented mixture was packed into whole bags and frozen to −20° C., flaked in a magurit flaker to particles having dimensions of 0.5×0.5×0.5 cm and warmed to −15° C. A brine at −8° C. composed of 10.08% sodium nitrite, 0.18% sodium ascorbate, 2.28% dextrose and 87.46% water (corresponding to an injection level of 40.5% and a 7% level of trimmings in the final product) was then mixed with the flakes of the fermented mixture in a ratio of 3 parts brine to 1 part flakes. The mixing was carried out by emulsifying three times to form a suspension. The suspension was then injected at −6° C. into one of the whole cuts of ham through a multi-needle injector, and the ham containing the fermented meat trimmings was then subjected to tenderisation, tumbling, moulding, cooking, chilling, storage, slicing and finally packaging, by conventional methods.

The chilled cooked ham had a longer shelf-life and an improved flavour compared with a similar product containing meat trimmings which had not been fermented. Furthermore, a similar product containing meat trimmings which had been fermented within the whole meat cut at 5° C. had a shorter shelf-life and an inferior flavour compared with the chilled cooked ham product as prepared in Example 1.

Example 2

A similar process to that described in Example 1 was followed except that the injection level of the suspension was only 17.3%, instead of the 40.3% level used in Example 1, giving an addition of only 3% trimmings in the final product instead of 7% in Example 1.

The chilled cooked ham had a longer shelf-life and an improved flavour compared with a similar product containing meat trimmings which had not been fermented. Furthermore, a similar product containing meat trimmings which had been fermented within the whole meat cut at 5° C. had a shorter shelf-life and an inferior flavour compared with the chilled cooked ham product as prepared in Example 2.

We claim:

1. In a process for incorporating meat trimmings into a meat wherein meat trim particles are frozen and combined with a brine or pickle or marinade to obtain a suspension which is incorporated into a meat piece, the improvement comprising prior to freezing the meat trim particles, inoculating the meat particles with a bacteria starter culture and fermenting the meat particles with the bacteria from the culture to obtain fermented meat trimmings.

2. The product of process claim 1.

3. A process for preparing a meat product comprising inoculating meat trim particles with a bacteria starter culture and fermenting meat particles with the bacteria from the culture to obtain fermented trimmings, freezing the fermented trimmings to obtain frozen trimmings, mixing the frozen trimmings with a composition selected from the group consisting of a brine, a pickle and a marinade to obtain a suspension and incorporating the suspension into a piece of meat to obtain a meat product and wherein a temperature of the suspension, prior to incorporation into the meat piece, does not exceed 1° C.

4. A process according to claim 3 wherein the suspension, when it is incorporated into the meat piece, has a temperature of from about −2° C. to −10° C.

5. A process according to claim 3 wherein the meat piece into which suspension is incorporated has a temperature of from 12° C. to −2° C.

6. A process according to claim 3 wherein the frozen trimmings have a temperature of from −5° C. to −30° C.

7. A process according to claim 6 wherein the composition has a temperature of from 0° C. to −30° C.

8. A process according to claim 3 further comprising flaking the frozen trimmings.

9. A process according to claim 8 wherein the frozen trimmings are flaked to form particles having a maximum volume of about 2 cc.

10. A process according to claim 1 or 3 wherein the bacteria is selected from the group consisting of Lactobacillus, Streptococcus and Pediococcus.

11. The product of process claim 10.

12. A process according to claim 1 or 3 wherein the bacteria is *Lactobacillus sake*.

13. A process according to claim 1 or 3 wherein the bacteria is selected from the group consisting of *Pediococcus acidilacti* and *Pediococcus salami*.

14. A process according to claim 1 or 3 wherein the meat trim particles are inoculated with the bacteria starter culture in an amount of from 0.1 ml to 10 ml starter culture per kg meat trim particles.

15. A process according to claim 1 or 3 wherein the fermentation is initiated at a pH of from 5.2 to 6.3.

16. A process according to claim 3 wherein the fermented trimmings and composition of the suspension are in a weight ratio of composition to trimmings of from 1:1 to 20:1.

17. A process according to claim 3 wherein the suspension is injected into the meat piece to incorporate the suspension into the meat piece.

18. A process according to claim 3 wherein the meat piece is tumbled with the suspension to incorporate the suspension into the meat piece.

19. A process according to claim 1 further comprising fermenting the meat particles in the presence of a composition selected from the group consisting of a brine, a pickle and a marinade and then freezing the fermented trimmings and composition for obtaining the frozen trimmings.

20. The product of process claim 3.

* * * * *

UNITED STATES PATENT AND TRADEMARK OFFICE
CERTIFICATE OF CORRECTION

PATENT NO. : 5,827,550
DATED : October 27, 1998
INVENTOR(S) : Marie BERGLUND, et al.

It is certified that error appears in the above-indentified patent and that said Letters Patent is hereby corrected as shown below:

Column 3, line 8, change "-40°" to -- -4° --.

In claim 19, line 1 (column 6, line 12) delete "1" and insert therefore -- 3 --.

Signed and Sealed this

Second Day of March, 1999

Attest:

Q. TODD DICKINSON

Attesting Officer

Acting Commissioner of Patents and Trademarks